United States Patent [19]
Conti-Ramsden et al.

[11] Patent Number: 4,877,839
[45] Date of Patent: Oct. 31, 1989

[54] FLUOROCOPOLYMER COMPOSITIONS

[75] Inventors: John N. Conti-Ramsden, Wilmington, Mass.; Richard L. Powell, Tarporley, England; Brian D. Young, Winsford, England; Jeffrey Farrar, Kelsall, England; Debra K. Brown, South Wirral, England

[73] Assignee: Imperial Chemical Industries PLC, London, England

[21] Appl. No.: 203,848

[22] Filed: Jun. 8, 1988

[30] Foreign Application Priority Data

Jun. 8, 1987 [GB] United Kingdom ............... 8713362

[51] Int. Cl.$^4$ ............... C08L 27/16; C08L 27/12; C08L 27/22; C08L 33/06
[52] U.S. Cl. ............... 525/200; 525/194; 525/197; 525/276; 524/520
[58] Field of Search ............... 525/200, 194

[56] References Cited

U.S. PATENT DOCUMENTS 4,588,781  5/1986  Ohmori et al. ............... 525/200

FOREIGN PATENT DOCUMENTS 55-025417  2/1980  Japan ............... 525/199

OTHER PUBLICATIONS

Japanese Kokai Publication No. 57-109811, Jul. 10, 1982.

Primary Examiner—Carman J. Seccuro
Attorney, Agent, or Firm—Cushman, Darby & Cushman

[57] ABSTRACT

Composition, optionally curable, comprising a fluorocopolymer admixed with an acrylic polymer, where the fluoropolymer comprises units of a fluorolefine (e.g. TFE) and fluoroallylether (e.g. tetrafluororallylether).

14 Claims, No Drawings

FLUOROCOPOLYMER COMPOSITIONS

The present invention relates to compositions comprising certain fluorine-containing copolymers (hereinafter fluorocopolymers) and acrylic polymers, and to particular fluorocopolymers for use therein.

It is known to employ various fluorine-containing homo- or copolymers as the basis for the provision of high quality products (such as coating films or paints, free-standing films, and moulded or sintered articles) since they possess properties such as excellent durability, weatherability, chemical and thermal resistance, stain resistance, and appearance. Such fluorine-containing polymers may optionally have incorporated therein functional monomeric units (for imparting cross-linkability) in order to achieve further advantages or further improved properties. These fluorine-containing polymers are, however, expensive materials. Moreover, products formed therefrom tend to be opaque.

It has been proposed to use certain of these fluorine-containing polymers in combination with acrylic polymers (typically polymethyl methacrylate) in order to overcome disadvantages such as lack of transparency; this also has the attraction of providing a cheaper material (acrylic polymers being much less expensive than fluorine-containing polymers). However, most fluorine-containing polymers have been found to be poorly compatible with acrylic polymers. (Complete compatibility in this context is taken to mean the situation where there is intimate mixing of the fluoro- and acrylic polymers at the molecular level, and is commonly assessed by differential scanning calorimetry DSC or dynamic mechanical thermal analysis DMTA.) For example, copolymers comprising fluorolefine, cyclohexyl vinyl ether and other comonomers described in Japanese Kokai Publication No. 57-34107 for use in high quality coating (e.g. paint) compositions which are curable at ambient temperature cannot be compatibly blended with acrylic polymers to provide products of good transparency. Indeed, to the best of our knowledge, the only fluorine-containing polymers hitherto described in the literature as being compatible with acrylic polymers are certain vinylidene fluoride copolymers (as described e.g. in European patent publication Nos. 0135917A and 0190654A) and certain copolymers comprising chlorotrifluoroethylene and 2,2,3,3-tetrafluopropyl vinyl ether (as described in European patent publication No. 0121934A). The choice of fluorine-containing polymers which are compatible with acrylic polymers for use in compositions has thus been very restricted.

We have now discovered a new class of high quality fluorine-containing polymer/acrylic polymer compositions which comprise certain fluorocopolymers (as defined hereinafter) many of which surprisingly found to have good to complete compatibility with acrylic polymers.

According to the present invention there is provided a composition comprising at least one fluorocopolymer and at least one acrylic polymer, wherein said fluorocopolymer is a copolymer comprising polymerised units derived from:

(A) at least one fluoroolefine of formula $CFX^1=CFX^2$ where $X^1$ is selected from F and halogen other than F (preferably Cl), and $X^2$ is selected from F, H, halogen other than F (preferably Cl), and perfluoroalkyl (preferably perfluoromethyl), and (B) at least one fluoroallylether of formula $CH_2=CHCH_2OR_f$ where $R_f$ is a fluoroalkyl group having 2 to 10 carbon atoms.

We have thus now discovered that, most surprisingly in view of the widely accepted view that homo- and copolymers of tetrafluoroethylene and most other fluorine containing homo- and copolymers are poorly compatible with acrylic polymers, many of the above-defined fluorocopolymers are compatible with acrylic polymers and will provide compositions therewith which when cast out from a solvent yield clear films indicating good compatibility and having a single glass transition (observed by DMTA or DSC) intermediate those of the pure polymers.

The at least one fluorolefine (A) is preferably selected from one or more of $CF_2=CF_2$ (tetrafluoroethylene, TFE), $CF_2=CFCl$ (chlorotrifluoroethylene, CTFE), $CF_2=CFCF_3$ (hexafluoropropylene, HFP), $CF_2=CFH$ (trifluoroethylene, TRFE) and $CFCl=CFCl$ (difluorodichloroethylene). More preferred for (A) are TFE, CTFE and HFP and TRFE, with TFE, CTFE, and TRFE being particularly preferred.

The fluoroallylether (B), in which the fluoroalkyl group $R_f$ may optionally also contain at least one halogen other than fluorine (e.g. chlorine), is preferably $CH_2=CHCH_2OCF_2CF_2H$ (tetrafluoroallylether, TFAE), $CH_2=CHCH_2OCF_2CF(H)CF_3$, or $CH_2=CHCH_2OCF_2CFClH$, with TFAE being the more preferred.

It may be pointed out that fluorocopolymers consisting of polymerised units (A) and (B) only are not in themselves new compounds, having been disclosed in Japanese Kokai Publication No. 57-109811. However, their advantageous combination with acrylic polymers (as described herein) has not previously been appreciated or disclosed.

In one embodiment of the invention the composition comprising said at least one fluorocopolymer (as defined herein) and said at least one acrylic polymer is curable, i.e. capable of undergoing cross-linking. This may be achieved by virtue of the at least one fluorocopolymer being cross-linkable, or by virtue of the at least one acrylic polymer being cross-linkable, or by both the fluorocopolymer and acrylic polymer being cross-linkable. (It is of course within the scope of the invention for the compositions not to be cross-linkable.)

In the case of the fluorocopolymer being cross-linkable, the copolymer should contain polymerised units derived from (C), namely at least one olefinically unsaturated comonomer bearing at least one functional group (e.g. hydroxy, carboxyl, ester hydrolysable to hydroxy, glycidyl, amino, siloxane) for imparting cross-linkability.

The fluoropolymer used in the composition of the invention may optionally comprise polymerised units derived from (D), namely at least one non-functional olefinically unsaturated monomer other than (A) or (B). Such an additional optional monomer could e.g. usefully be employed to control the glass transition temperature (Tg) of the fluorocopolymer. Typical examples of such additional optional monomers include: alkyl, aryl, or cycloalkyl vinyl ethers (or fluoro-substituted derivatives thereof) such as cyclohexyl vinyl ether, ethyl vinyl ether, n-butyl vinyl ether, cyclopentyl vinyl ether, and phenyl vinyl ether; and vinyl esters such as $CH_2=CHOCOCH_3$ (vinyl acetate), $CH_2=CHOCOC(CH_3)(C_2H_5)([CH_2]_4CH_3)$, $CH_2=CHOCOC(CH_3)_2([CH_2]_5CH_3)$, and $CH_2=CHOCOPh$ (Ph is phenyl).

Examples of the at least one acrylic polymer used in the composition of the invention include, for instance, homo- and copolymers of alkyl acrylates or methacrylates having 1 to 20 carbon atoms in the alkyl group. Examples of these are, for instance, homo- and copolymers of alkyl acrylates or methacrylates such as methyl acrylate or methacrylate, ethyl acrylate or methacrylate, n-butyl acrylate or methacrylate, cyclohexyl acrylate or methacrylate; where the acrylic polymer is a copolymer, the comonomer(s) may be another acrylic monomer (e.g as exemplified above) and/or a non-acrylic monomer such as styrene. As mentioned above, the acrylic polymer is optionally cross-linkable. Such cross-linkability in the acrylic polymer may be achieved, for example, by including polymerised units of at least one olefinically unsaturated functional monomer in the polymer, such as for instance hydroxyethyl methacrylate, glycidyl methacrylate, acrylamide, methacrylamide, acrylic acid, or methacrylic acid. If such a functional monomer is acrylic in nature, it may constitute the sole monomer of the acrylic polymer; more usually however it is a comonomer employed with a non-functional acrylic monomer(s) (particularly one or more of those described above).

In the fluorocopolymer used for the compositions of the invention, the polymerised units derived from (A) are preferably present in an amount of 30 to 70 mole %, more preferably 30 to 50 mole % (typically 30 to 40 mole %). The polymerised units derived from (B) are preferably present in an amount of 70 to 30 mole %, more preferably 70 to 50 mole % (typically 70 to 60 mole %). The polymerised units derived from (C) are preferably present in amount of 0 to 40 mole %, more preferably 0 to 20 mole % (typically 0 to 10 mole %).

The polymerised units derived from (D) are preferably present in an amount of 0 to 40 mole %, more preferably 0 to 20 mole % (typically 0 to 10 mole %).

For good to complete compatibility of the fluorocopolymer and acrylic polymer components, the mole ratio of (A) to (B) polymerised units is typically within the range of from 1/2.5 to 1/1 (particularly ½ to 1/1.5.)

The fluorocopolymers of the composition of the invention usually have a number average molecular weight ($M_n$) within the range 500 to 300,000, more usually 1000 to 200,000, and particularly 3000 to 150,000 (measured using gel permeation chromatography).

The fluorocopolymers may be prepared by polymerisation in aqueous emulsion, in aqueous suspension, in solution or in bulk. Polymerisation is usually carried out in the temperature range $-20°$ to $180°$ C., more usually $80°$ to $150°$ C., under a pressure usually in the range 1 to 50 Kg/Cm$^2$. A free-radical yielding initiator is normally employed, for example an organic peroxide, azo compound, or a redox initiator system comprising persulphate (as appropriate to the polymerisation medium). Optionally a chain transfer agent, for example methyl cyclohexane, may be used to reduce the molecular weight. The polymerisation medium may, for example, be water or an aqueous medium (in the case of emulsion or suspension polymerisation) or an appropriate organic solvent (in the case of solution polymerisation). Emulsion polymerisation is normally performed in the presence of a surfactant(s) as emulsifier.

The at least one acrylic polymer used in the composition preferably comprises at least 50 mole % of acrylic-type units.

The acrylic polymer preferably has a number average molecular weight $M_n$ within the range 1000 to 300,000.

The ratio (by weight, dry) of the at least one fluorocopolymer to the at least one acrylic polymer is preferably in the range 5/95 to 95/5, more preferably 20/80 to 80/20 (and typically 40/60 to 60/40).

When the composition of the invention is curable (cross-linkable), a curing agent may be included if a cured composition is ultimately desired (although in the case of siloxane functionality in the fluorocopolymer, the ambient moisture may be sufficient to effect curing, and also in some cases the comonomer(s) imparting cross-linkability may render the composition self-cross-linking, i.e. without the need for a curing agent, for example through the action of heat or radiation) this usually being a compound with at least two groups capable of reacting with the functional group(s) of the fluorocopolymer and/or acrylic polymer. Curing at ambient temperature or by baking (or heating) at an elevated or intermediate temperature is envisaged (according to the cross-linking system employed). The curing agent, which will of course need to be selected according to the particular functional groups existing in the polymer(s) of the composition of the invention, may for example be selected from polyfunctional isocyanates, polyamino compounds (e.g. melamines), polyepoxide compounds, epoxy/acid compounds, epoxy/amine compounds, amino/formaldehyde compounds, siloxane compounds, glycidyl compounds, and so on.

The curing agent (if used) is usually employed in an amount of 0.5 to 5 equivalents based on the functional group(s) of the polymer(s).

The compositions of the invention may be in any suitable form, for example in the form of solutions (prepared e.g. by mixing solutions of the fluorocopolymer(s) and acrylic polymer(s) in organic solvents, or by adding the isolated polymers to a solvent with appropriate agitation). Suitable solvents are e.g. aromatic hydrocarbons (e.g. benzene, xylene, toluene), ketones (e.g. acetone, methyl ethyl ketone), esters (e.g. ethyl acetate, n-butyl acetate and ethyl glycol acetate), and halogenated hydrocarbons (e.g. trichloroethane). Mixtures of solvents may be used where appropriate. The compositions may also for example be in the form of aqueous emulsions or suspensions, or in the form of dry powder blends, or dry compound prepared e.g. by milling on hot rolls. An aqueous emulsion may be obtained by a number of different routes, for examples by blending an aqueous emulsion(s) of the fluorocopolymer(s) (prepared either directly by emulsion polymerisation or by post-emulsification of a preformed polymer) with an aqueous emulsion(s) of the acrylic polymer(s). Alternatively, the blend may be prepared by successive polymerisation of the acrylic monomer(s) forming the acrylic polymer in the presence of the fluorocopolymer emulsion, or vice versa.

The compositions of the invention may be employed for various applications (using a form of composition, e.g. solution or aqueous dispersion or powder blend etc, appropriate to the application). Examples of such applications are solvent- or aqueous based coating compositions, high solids or solventless compositions, and fabrication into articles (e.g. self-supporting films, optical fibre claddings, moulded articles etc).

The compositions of the invention may include any additives appropriate to the form of the compositions and the application(s) envisaged, e.g. pigments, dyes, curing agents (which may be added just before use, as in 2 pack systems), viscosity controllers, levelling agents, gelation aids or inhibitors, ultra-violet stabilisers, thermal stabilisers, antioxidants, anti-skin-forming agents, surfactants, and anti-foams.

Where the compositions of the invention are in the form of coating compositions, they may be applied in the same manner as any ordinary liquid coating material (e.g. paint) to the surface of a substrate such as metal, wood, plastics, ceramic, paper or glass.

The present invention is now further illustrated by reference to the following examples. Unless otherwise indicated all parts and percentages are on a weight basis.

EXAMPLE 1

A composition according to the invention was prepared as follows.

A TFE/TFAE copolymer, mole ratio of TFA:TFAE 1:2 (i.e. 33.3 mole % TFE, 66.7 mole % TFAE) and Mn 9,000, was dissolved in toluene (30% w/w) to give a cloudy solution. A methyl methacrylate/ethyl methacrylate/hydroxyethyl methacrylate copolymer of composition 77.2/16.5/6.3 (w/w) and Mn 11272 was dissolved in n-butyl acetate. The solutions were blended to obtain a composition containing a 50:50: (w/w) mixture of the copolymers.

The composition was cast onto a glass plate and the solvent allowed to evaporate. A completely colourless, transparent film coating was obtained. Examination by dynamic mechanical thermal analysis (DMTA) showed that the composition exhibited a single glass transition intermediate those of the pure polymers.

EXAMPLE 2

The procedure of Example 1 was repeated except that the fluorocopolymer employed was a TFE/TFAE copolymer of mole ratio 1/1.6 (i.e. 38.5 mole % TFE, 61.5 mole % TFAE) and Mn 16,000.

A colourless, transparent film coating was obtained having a single glass transition.

EXAMPLE 3

A composition according to the invention was prepared using a fluorocopolymer solution as per Example 1 and a solution of the acrylic polymer "Desmophen" A450 (Bayer) in xylene/ethyl glycol acetate (1:1). This acrylic polymer, Mn 7796, is a hydroxyl-bearing polyacrylate (exact structure not known).

The solutions were mixed as in Example 1 to obtain a composition containing a 50:50 (w/w) mixture of the polymers and the composition was similarly cast onto a glass plate.

A colourless, transparent film coating was obtained having a single glass transition.

We claim:

1. Composition comprising at least one fluorocopolymer and at least one acrylic polymer, wherein said fluorocopolymer is a copolymer comprising polymerised units derived from:

(A) at least one fluoroolefine of formulate $CFX^1=CFX^2$ where $X^1$ is selected from F and halogen other than F and $X^2$ is selected from F, H, halogen other than F, and perfluoroalykyl; and (B) at least one fluoroallylether of formula $CH_2CHCH_2OR_f$ where $R_f$ is a fluoroalkyl group having 2 to 10 carbon atoms.

2. Composition according to claim 1 wherein (A) is selected from one or more of $CF_2=CF_2$ (tetrafluoroethylene), $CF_2=CFCl$ (chlorotrifluoroethylene), $CF_2=CFCF_3$ (hexafluoropropylene), $CF_2=CFH$ (trifluoroethylene), and $CFCl=CFCl$ (dichlorodifluoroethylene).

3. Composition according to either claim 1 wherein (B) is selected from $CH_2=CHCH_2OCF_2CF_2H$ (tetrafluoroallylether), $CH_2=CHCH_2OCF_2CF(H)CF_3$, and $CH_2=CHCH_2OCF_2CFClH$.

4. Composition according to claim 1 wherein said acrylic polymer is selected from homo- and copolymers of alkyl acrylates and alkyl methacrylates having 1 to 20 carbon atoms in the alkyl group.

5. Composition according to claim 1 wherein said composition is curable.

6. Composition according to claim 5 wherein said at least one fluorocopolymer comprises polymerised units derived from (C), namely at least one olefinically unsaturated comonomer bearing at least one functional group for imparting curability.

7. Composition according to claim 1 wherein said fluorocopolymer comprises polymerised units derived from (D), namely at least one non-functional olefinically unsaturated monomer other than (A) or (B).

8. Composition according to claim 7 wherein (D) is selected from one or more of alkyl, aryl or cycloalkyl vinyl ethers (or fluoro-substituted derivatives thereof) and vinyl esters.

9. Composition according to claim 1 wherein said fluorocopolymer comprises 30 to 70 mole % of polymerised units derived from (A), 70 to 30 mole % of polymerised units derived from (B), 0 to 40 mole % of polymerised units derived from (C) where (C) is and 0 to 40 mole % of polymerised units derived from (D) where (D) is the total of all polymerised units being 100 mole %.

10. Composition according to claim 9 wherein said fluorocopolymer comprises 30 to 50 mole % of polymerised units derived from (A), 70 to 50 mole % of polymerised units derived from (B), 0 to 20 mole % of polymerised units derived from (C), and 0 to 20 mole % of polymerised units derived from (D).

11. Composition according to claim 1 wherein the ratio (by weight, dry) of the at least one fluorocopolymer to the at least one acrylic polymer is within the range of from 5/95 to 95/5.

12. Composition according to claim 5 to 11 wherein said composition contains a curing agent.

13. Composition according to claim 1 wherein said composition in the form of an organic solvent solution of the polymers.

14. Composition according to claim 1 wherein said composition is in the form of an aqueous emulsion or suspension of the polymers, or in the form of a dry powder blend.

* * * * *